United States Patent [19]
Cavanaugh, III et al.

[11] Patent Number: 5,991,823
[45] Date of Patent: Nov. 23, 1999

[54] LOW OVERHEAD OBJECT ADAPTOR

[75] Inventors: Ken M. Cavanaugh, III, Montara; Alan Snyder, Palo Alto; Swee Boon Lim, Mountain View; Christian J. Callsen, Menlo Park, all of Calif.

[73] Assignee: Sun Microsystems, Inc., Palo Alto, Calif.

[21] Appl. No.: 08/669,782

[22] Filed: Jun. 26, 1996

[51] Int. Cl.$^6$ .................................................. G06F 9/46
[52] U.S. Cl. .......................................................... 709/304
[58] Field of Search .................................... 395/680, 683, 395/684

[56] References Cited

U.S. PATENT DOCUMENTS

| | | | |
|---|---|---|---|
| 5,307,490 | 4/1994 | Davidson | 395/684 |
| 5,566,302 | 10/1996 | Khalidi et al. | 395/200.09 |
| 5,577,251 | 11/1996 | Hamilton et al. | 395/671 |
| 5,724,503 | 3/1998 | Kleinman et al. | 395/185.1 |
| 5,737,607 | 4/1998 | Hamilton et al. | 395/701 |
| 5,787,251 | 7/1998 | Hamilton | 395/200.33 |

OTHER PUBLICATIONS

Hamilton, Graham, et al., Subcontract: A Flexible Base for Distributed Programming, 1993, Sun Microsystems Laboratories, Inc.

Hamilton, et al., Subcontract: A Flexible Base for Distributed Programming, Apr. 1993, The SMLI Technical Report Series published by Sun Microsystems Laboratories, Inc.

*Primary Examiner*—Alvin E. Oberley
*Assistant Examiner*—St. John Courtenay, III
*Attorney, Agent, or Firm*—Beyer & Weaver, LLP

[57] ABSTRACT

Data structures and various methods for invoking and creating objects are used in a distributed object system in order to implement subcontracts. A subcontract is a selected grouping of basic features or object mechanisms that a system provides for use in managing objects and has associated functions. A subcontract registry is used for creating object references for server objects. The subcontract registry has any number of subcontract objects within it, and each subcontract object may include: a subcontract identifier that identifies the subcontract object, a quality of service list that contains feature name-value pairs, and a create function unique to the subcontract object. An implementation registry is used for registering any number of implementation definitions. Each implementation definition defines an implementation for an interface within the system, and each implementation definition may include: an implementation identifier that identifies the implementation, a pointer to a subcontract object contained in the subcontract registry, an interface identifier that identifies the interface being implemented, and a set of functions used for creating and invoking a server object that are unique to that implementation. One method creates an object reference for a distributed server object by using the subcontract registry in order to identify the unique create function to be used that corresponds to the subcontract functionality desired. Another technique invokes a method defined on a server object by using an object reference to find the appropriate implementation definition in the implementation registry. Lookup and dispatch functions unique to this definition are used to invoke the method.

24 Claims, 11 Drawing Sheets

Figure 2

Subcontract Registry (200)

| SUBCONTRACT IDENTIFIER | QUALITY OF SERVICE LIST | SUBCONTRACT CLIENT REPRESENTATION CREATE FUNCTION | OTHER FUNCTIONS |
|---|---|---|---|
| 1 | [ (CLEAN SHUTDOWN, NO) (SECURITY, AUTHENTICATE MD5) (PERSISTENCE, YES) (SERVER ACTIVATION, YES) ] | CLIENT REP CREATE1 | UNMARSHAL, DESTRINGIFY, BAD SERVER HANDLER, ETC. |
| 2 | [ (CLEAN SHUTDOWN, YES) (SECURITY, AUTHENTICATE MD5) (PERSISTENCE, YES) (SERVER ACTIVATION, YES) ] | CLIENT REP CREATE2 | ... |
| 3 | [ (CLEAN SHUTDOWN, YES) (SECURITY, AUTHENTICATE MD5) (PERSISTENCE, YES) (SERVER ACTIVATION, NO) ] | CLIENT REP CREATE3 | ... |
| ... | ... | ... | ... |

Figure 3

Implementation Registry (250)

| IMPLEMENTATION IDENTIFIER | SUBCONTRACT META OBJECT | INTERFACE IDENTIFIER | READY FLAG | CALL BACK FUNCTIONS | SKELETON INFORMATION |
|---|---|---|---|---|---|
| PRINTER | | PRINTER INTERFACE | YES | LOOK UP POST INVOKE REVOKE DEACTIVATE SHUTDOWN | SKELETON DISPATCH FUNCTION, ETC. |
| MODEM | | MODEM INTERFACE | YES | LOOK UP POST INVOKE REVOKE DEACTIVATE SHUTDOWN | ... |
| ... | ... | ... | YES/NO | ... | ... |

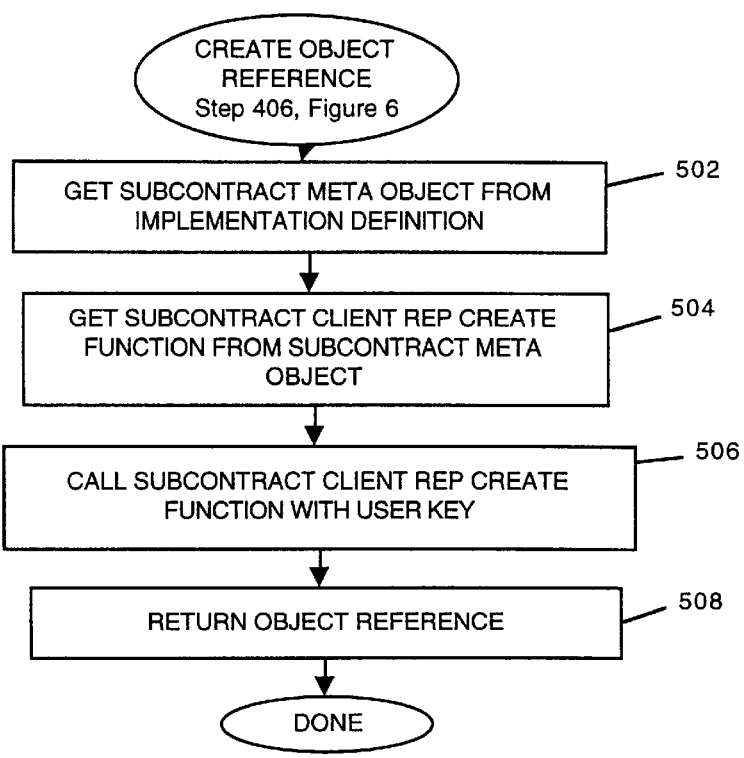
Figure 9
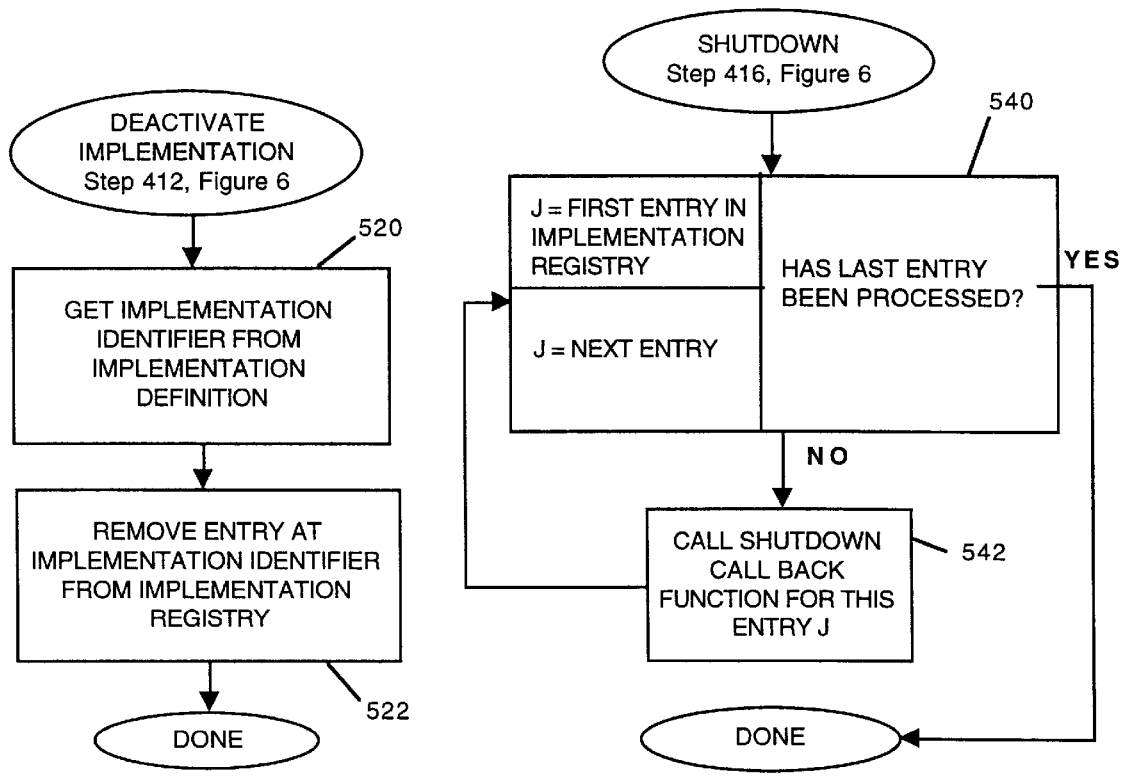
Figure 10
Figure 11

LOW OVERHEAD OBJECT ADAPTOR

CROSS REFERENCE TO RELATED APPLICATIONS

U.S. patent application "Method and Apparatus for Subcontracts in Distributed Processing Systems", Ser. No. 08/554,794 filed Nov. 7, 1995, a continuation of Ser. No. 07/995,863, filed Dec. 21, 1992, now abandoned, is related to the present application and is incorporated by reference herein in its entirety. Additionally, the following U.S. patent applications, all filed concurrently herewith, are related to the present application and are incorporated by reference herein in their entirety: Ser. No. 08/670,684, Ser. No. 08/673,181, Ser. No. 08/670,681, Ser. No. 08/670,700, Ser. No. 08/670,682.

FIELD OF THE INVENTION

The present invention relates generally to distributed object systems. More specifically, the present invention relates to a low overhead object adaptor within a distributed object system that is able to apply selected features in such a system to the use of individual objects.

BACKGROUND OF THE INVENTION

With the increasing popularity of object-oriented programming languages and systems, the development of distributed object systems has presented new challenges regarding the creation, referencing, invocation and use in general of the objects within these distributed systems. It has become common to provide remote procedure call (RPC) facilities that extend the semantics of local procedure calls to these distributed object systems. This often takes the form of remote object invocation. However, rather than there being a single set of obvious semantics for all remote objects, there appears to be a wide range of possible object semantics, often reflecting different application requirements. For example, there are distributed object systems that include integrated support for the features of replication, atomic transactions, object migration, and persistence. But there are also distributed object systems that provide only minimal features and instead concentrate on high performance.

One possible reaction to this diversity is to attempt to design a single distributed object system for remote objects that includes all possible features. Unfortunately, the list of possible features is continually expanding, and not all features are necessarily compatible. For example, a high performance system may not want its objects to include support for the features of persistence or atomicity. Moreover, there are often a variety of different ways of implementing a given set of semantics. Having a single system prevents applications from exploiting new and improved features that may better reflect their real needs. For example, in order to increase reliability, it may be desired to support the feature of object replication. However, it would not be desirable to have client application code doing extra work simply to talk to replicated objects, so it would be preferable to support replication "underneath the covers", as part of the object's invocation mechanism. But there are many different ways of implementing replication, and it is undesirable to build in support for some particular set of features while implicitly rejecting others.

There are a wide variety of features or object mechanisms that a distributed object system might provide. By way of example, a distributed object system may provide such features such as replication, atomic transactions, object migration, persistence, naming, event notification, relationships, server activation, clean shutdown, transactions, security, and enablement of filters (compression, encryption, tracing, debugging, etc.). These features may also be called services and may be provided by an Object Services module as part of a distributed object system. Past distributed object systems have suffered in that they were unable to provide a flexible subset of these features for different applications, much less for different objects within an application. Past systems only provided a fixed set of these features.

This deficiency may be addressed through the notion of a subcontract. Subcontracts and their use are described in the above-referenced patent application Ser. No. 08/554,794. The notion of a subcontract is also described in "Subcontract: A Flexible Base for Distributed Programming" by G. Hamilton, M. Powell and J. Mitchell, published by Sun Microsystems Laboratories, Inc., 1993. Subcontracts and their associated functionality may be implemented in many different ways.

Through the use of subcontracts, an application may specify which of the various above features (among others) it wishes to take advantage of, or may even specify different groups of features that may be used by different objects within the application. A group or a permutation of these features is termed a subcontract. Thus, each object within an application may utilize a particular subcontract (or group of features). A group of desired features is also termed a desired a quality of service. And these desired features may be represented in a quality of service list. A subcontract, then, delivers a particular quality of service within a distributed object application. An object may have one subcontract associated with it at a given time. Subcontracts are separate from object interfaces and object implementations. Thus, it is easy for object implementers to either select and use an existing subcontract, or to implement a new subcontract. Correspondingly, application level programmers need not be aware of the specific subcontracts that are being used for particular objects. A subcontract associated with an object allows the business of implementing an object to be separate from the business of implementing the object mechanisms or features provided by the system.

One of the reasons that subcontracts are effective is because they separate out the business of implementing objects from implementing object mechanisms. The availability of subcontracts enable object implementers to choose from a range of different object mechanisms (or features) without requiring that every object implementer must become familiar with the details of the object implementation machinery. The set of features that subcontracts provide are the right levers for obtaining control within a distributed environment. By design, all of the key actions taken on remote objects will involve the object's subcontract in one way or another. By way of example, actions such as object creation, object reference creation and method invocation involve the object's subcontract. Subcontracts provide an effective way for plugging in different policies for different objects and are successful in reducing the functionality that must be provided by the base system.

However, conventional distributed object system have not utilized the functionality of subcontracts and are not well adapted to integrating subcontracts. The common object request broker architecture (CORBA), defines the notion of an object adaptor. Among other tasks, an object adaptor creates servant objects and dispatches requests to a server. Object adaptors provide a limited set of choices about the server-side object mechanisms. However, most object adaptors are supplied as part of the basic object machinery, and it is not realistically possible for application writers to implement new object adaptors, or for the object machinery to discover and install new object adaptors at run time. For example, the Basic Object Adaptor (BOA) defined under CORBA is very limited in that it only provides a fixed set of features. As discussed above, it is less than desirable that an object only be provided with a fixed set of features. And even if all features are supplied, this comes at the expense of performance, and vice-versa. However, one object in a particular application may only need to utilize a limited set of features, as contrasted with a different object in the same application that needs a different set of features. Thus, prior art object adaptors may unnecessarily burden objects with extra features resulting in high overhead and increased use of CPU time.

Accordingly, the creation of a mechanism that is able to implement some of the traditional object adaptor functions, while at the same time, being capable of taking advantage of the use of subcontracts would be desirable. Such an object adaptor would overcome the shortcomings of fixed Object Adaptors in that it would permit different objects within a distributed system to take advantages of some, but not necessarily all of the features provided by the distributed object system.

SUMMARY OF THE INVENTION

Embodiments of the present invention relate to data structures for use with subcontracts as well as various methods for invoking and creating objects. One data structure is a subcontract registry embodied in a computer-readable medium. The subcontract registry is used for creating object references for server objects within a distributed object computing system. The distributed object computing system may provide a number of features (or object mechanisms) for use in the creation of object references for server objects. The subcontract registry has any number of subcontract objects within it, and each subcontract object contains information relating to a particular subcontract. That information may include: a subcontract identifier that identifies the subcontract object and a quality of service list that contains feature name-value pairs. The feature name identifies one of the features that the particular subcontract may provide, and the value may indicate whether the feature is present or not, or may further qualify the feature name. Also included is a create function unique to the subcontract object. The create function is used to create and return an object reference for a server object by way of using the features identified by the feature names in the quality of service list.

Another data structure is the implementation registry, also embodied in a computer-readable medium. The implementation registry is used for registering any number of implementation definitions. Each implementation definition defines an implementation for an interface within a distributed object computing system, and each implementation definition contains information relating to that implementation. That information may include: an implementation identifier that identifies the implementation, a location indicator to a subcontract object contained in the subcontract registry, an interface identifier that identifies the interface being implemented, and a set of functions used for creating and invoking a server object that are unique to that implementation.

One embodiment of the present invention relates to a method of creating an object reference for a distributed server object within the distributed object computing system. The method begins by requesting that an object reference be created for a server object. Then, a subcontract in the subcontract registry is identified that corresponds to the server object to be created. This subcontract will have a quality of service list that identifies the quality of service to be utilized in invoking an implementation of the server object. The create function of the subcontract is also identified. The create function is responsible for creating the server object in a manner corresponding to the quality of service list. The create function is invoked in order to produce an object reference for the server object, which is returned to the calling entity.

Another embodiment relates to invoking a method defined on a distributed server object. Initially, a marshal buffer containing an object reference to the server object is received. Once received, an implementation identifier is extracted from the object reference. An implementation definition within the implementation registry is also determined by using the extracted implementation identifier as a key. A lookup function of the implementation definition is then called in order to produce a location indicator to the server object. Once the location indicator is produced, a skeleton dispatch function of the implementation definition is called in order to invoke the object method defined on the server object.

BRIEF DESCRIPTION OF THE DRAWINGS

The invention, together with further advantages thereof, may best be understood by reference to the following description taken in conjunction with the accompanying drawings in which:

FIG. 1b shows the flow of a request from a client to a servant object within the distributed object system of FIG. 1a.

FIG. 2 shows a subcontract registry table having various subcontract meta objects as entries according to one embodiment of the present invention.

FIG. 3 shows an implementation registry table having various implementation definitions as entries according to one embodiment of the present invention.

FIG. 9 shows the create object reference step of FIG. 6.

FIG. 10 shows the deactivate implementation step of FIG. 6.

FIG. 11 shows the shutdown step of FIG. 6.

DETAILED DESCRIPTION OF THE INVENTION

OVERVIEW

Figure 1A:
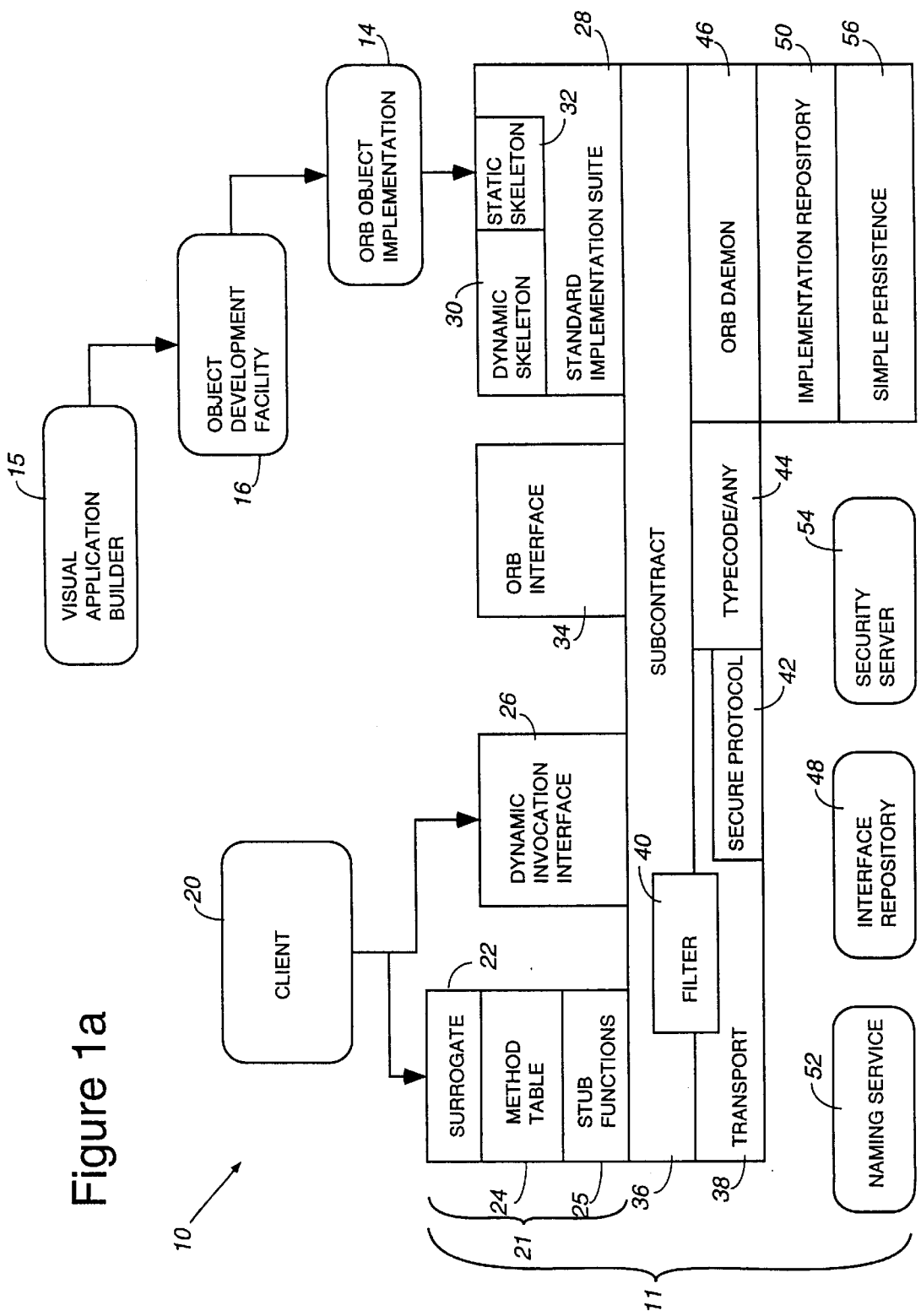
FIG. 1a illustrates a distributed object system having an object request broker (ORB) portion, object development facilities and client and server objects according to one embodiment of the present invention.
Figure 1B:
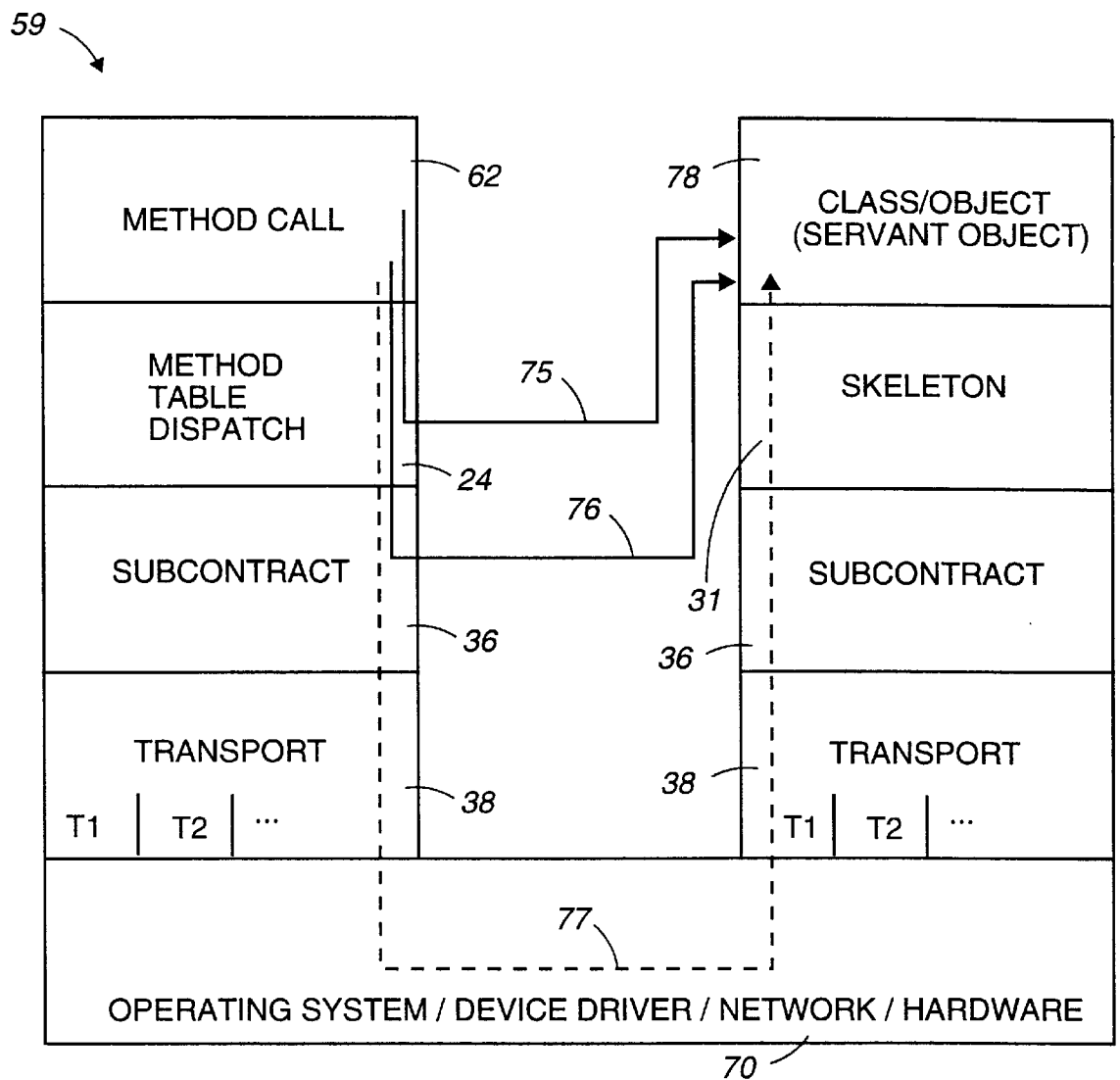
Figure 5:
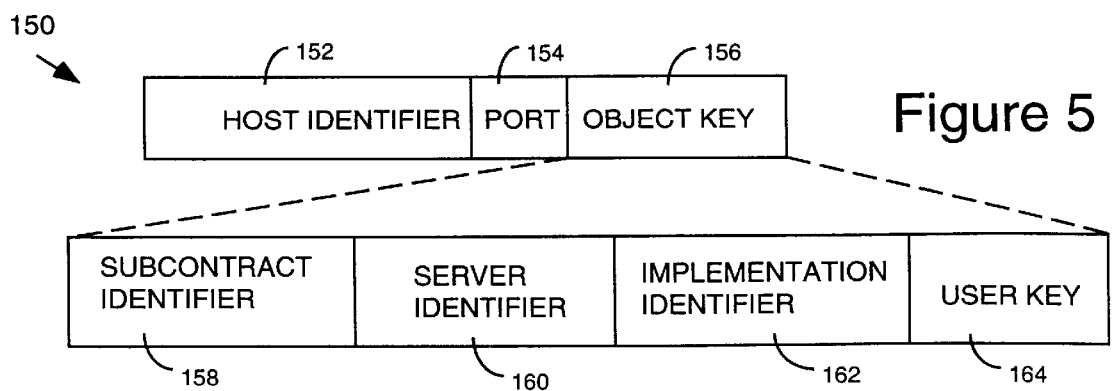
FIG. 5 is an embodiment of an object reference suitable for use within the distributed object system of FIGS. 1a and 1b.

The present invention is directed toward distributed object systems and will be described with reference to several preferred embodiments as illustrated in the accompanying drawings. The invention may be practiced within the context of any suitable distributed object system, including those defined under CORBA or any other suitable specification. However, for purposes of illustration, an embodiment of the present invention will be described primarily within the context of an Object Request Broker (ORB) implemented under the CORBA specification from the Object Management Group (OMG), Revision 2.0, dated July 1995, which is incorporated herein by reference. FIG. 1a diagrammatically illustrates the overall architecture of a representative distributed object system suitable for implementing an embodiment of the present invention. FIG. 1b diagrammatically illustrates some possible flow paths that a request from a client to a servant object may follow within such an architecture that includes a three-level dispatch mechanism. FIG. 5 shows one object reference data structure that may be used by a client to refer to a servant object.

A distributed object system 10 typically includes an Object Request Broker (ORB) 11 as is symbolically illustrated in FIG. 1a. ORB 11 provides all of the location and transport mechanisms and facilities necessary to deliver a call from a client to a servant (target object) and to return a response to the client, as will be discussed below with reference to FIG. 1b. The client and servant may be located in the same process, in different processes on the same machine, or on completely different machines. For the purposes of this discussion, client 20 may be any code that invokes an operation on a distributed object and thus may or may not take the form of a distributed object or a process. A distributed object may have a wide variety of representations. By way of example, the distributed object may be a C++ object that has been provided by an application developer. Alternatively, an implementation for a distributed object may be developed within a visual application builder 15. This visual application builder allows a developer to visually select existing object types from a catalog and graphically connect the services provided by one object to the services needed by another (attributes, arguments, results etc.) in order to create a new implementation for an object.

An object development facility 16 may be used to simplify the creation and the installation of distributed objects. It is used to "wrap" or encapsulate developer objects in distributed object code. As such, object development facility 16 may be used to transform a developer object into an ORB object implementation 14. In this example, ORB object implementation 14 is presented as a server as shown by its location in the diagram. A developer uses an interface definition language to define an interface for an ORB object, provides a developer object implementation that implements that object's behavior, and then uses the object development facility 16 in order to produce an ORB object implementation 14. At run time, an instance of this ORB object (a servant object) is created that will utilize this ORB object implementation 14. It should be appreciated that the object development facility may also be used to create objects that take the role of clients at some point.

Client 20 communicates with a servant by way of a stub 21, a subcontract layer 36, possibly a filter 40, and a transport layer 38. Stub 21 includes a surrogate 22, a method table 24 and stub functions 25. Client 20 communicates initially with surrogate 22 that appears to the client as the servant object. Alternatively, client 20 may communicate directly with the servant object through a dynamic invocation interface (DII) 26 instead of through surrogate 22, method table 24 and stub functions 25. Dynamic invocation interface 26 is used to enable clients to construct dynamic requests. One procedure by which a client may make a call to a servant utilizing the above layers is described in more detail below with reference to FIG. 1b.

Subcontract layer 36 provides the functionality required by an object in order to utilize subcontracts to implement various services (or features or object mechanisms) named by a particular subcontract, as described in greater detail in above-referenced U.S. patent application Ser. No. 08/554,794, filed Nov. 7, 1995. A subcontract identifies a quality of service provided by the distributed object system that may be utilized by an individual object. For example, a subcontract may identify that the feature of security is to be used for a particular object. A technique by which a particular subcontract may be associated dynamically at run time with a servant object is described in above-referenced U.S. patent application Ser. No. 08/670,682. Filter 40, if being used, may perform a variety of tasks, such as compression, encryption, tracing, or debugging, that are to be applied to communications to and from an object.

Transport layer 38 operates to marshal, unmarshal and physically transport information to and from a servant that typically does not share the same process as a client. Mechanisms for marshaling and unmarshaling inter-object communications are described in above-referenced U.S. patent application Ser. No. 08/673,181. A technique for marshaling/unmarshaling an object reference is described in above-referenced U.S. patent application Ser. No. 08/670,181.

A standard implementation suite 28 (or object adapter) represents a set of subcontracts that interact with ORB objects 14 in identical ways, as for example object key management. One such implementation suite is described in the below description of the present invention. It should be noted that a subcontract may belong to multiple implementation suites. Also, implementation suites may utilize different subcontracts. A skeleton, that may take the form of either static skeleton 32 or dynamic skeleton 30, is used to transform requests into a format required by a servant object 78 (as will be explained in more detail below with reference to FIG. 1b). Thus, skeletons 30 and 32 call an appropriate servant object 78. Static skeleton 32 is used to call interface-specific object implementations 14, while dynamic skeleton 30 is used generically when interface-specific objects are not available. An ORB interface 34 is the interface that goes directly to the ORB that is the same for all ORBs and does not depend upon an object's interface or object adapter.

An ORB daemon 46 is responsible for ensuring that object servers are active when invoked by clients. A technique for starting object servers is disclosed in U.S. patent application Ser. No. 08/408,645, now abandoned, which is hereby incorporated by reference.

Secure Protocol 42 is a secure interoperability protocol that secures the internet inter-ORB protocol and helps to transmit information through transport layer 38 in a secure fashion. This may mean integrity protection, confidentiality, etc. The internet inter-ORB protocol is a protocol that typically communicates between processes on different machines. However, in some cases, the internet inter-ORB protocol may communicate between processes on the same machine. The security server 54 is a security administration server that secures the services that are used between processes on different computers.

Typecode/Any module 44 implements "Typecode" and "Any" objects. Typecode describes an Interface Definition Language (IDL) data type, allowing type descriptions to be transmitted between clients and servers. An instance of an IDL data type may be encapsulated by an Any object. An Any object refers to typecode of the encapsulated data, and a generic encoding of the data.

An implementation repository 50 is used to store information relating to object servers. Specifically, implementation repository 50 stores the information needed to start a server process. For example, implementation repository 50 stores information such as the location of the server program, any arguments to the program, and any environment variables to pass to the program, etc.

Simple persistence 56 uses an Interface Definition Language (IDL)-defined type and the output from running that IDL type through the IDL compiler, together with a portion of additional code so that an IDL-defined type can be read from, and written to, disk. A naming service 52 is used to name ORB objects. A client may use naming service 52 to find a desired object by name. Naming service 52 returns an object reference, that in turn may be used to send requests to that object. An Interface Repository 48 (IFR) knows about all interfaces for all objects within the distributed object system.

A request made by a client using a method table ("m-table") dispatch will pass through a variety of the aforementioned layers of the architecture on its way to the servant as diagrammatically illustrated in FIG. 1*b*. The request is initiated by a client and may take any suitable form. The form of the request will depend to a large extent upon the nature of the programming language used to create the client. By way of example, if the client is written in the C++ language, the request may take the form of a C++ method call 62. The call is made to a designated object reference taking the form of a surrogate. The surrogate includes methods that comply with the object's interface.

As will be appreciated by those skilled in the art, the object reference used at different locations within a distributed object system may vary significantly in appearance. In the embodiment described, the client side object reference is a dual pointer (referred to herein as a "fat pointer"). A fat pointer contains two distinct pointers. A first pointer points to a client representation ("client rep") associated with the referenced object. A second pointer points to a method table of the method table dispatch 24 that is associated with the referenced object. A client representation is an object that has methods that support invocation as well as CORBA defined "pseudo" object reference operations. These operations include, but are not limited to, a "duplicate" method, a "release" method, a "narrow" method, a "hash" method, and an "is equivalent" method.

After the client has initiated a call, the call is processed using a method table dispatch mechanism 24. Such a technique is disclosed in U.S. patent application Ser. No. 08/307,929 and is hereby incorporated by reference.

The method table dispatch mechanism uses a method table that contains a list of location indicators to stub functions 25, one of which is associated with the method to be invoked. Stub functions 25 receive a function or procedure call in the "native" language of the client process, then use either a subcontract layer 36 or a native call to eventually call the corresponding servant object. The native language may be any suitable language, as for example a language such as C++.

Method table dispatch 24 determines the appropriate one of the stub functions 25 to process the method call, and then pairs the method call with the appropriate stub function. In the event that the client making the method call is in the same process as the servant object, a local stub function is called. The local stub function sends the method call directly to servant object 78. A technique for routing calls within a local process is described in above-referenced U.S. patent application Ser. No. 08/670,684. Alternatively, if the servant object is in a different process, i.e. a remote process, a remote stub function is called. The remote stub function invokes the client representation, that delivers the invocation to servant object 78.

Subcontracts implemented by subcontract layer 36 are logic modules that provide control of the basic mechanisms of object invocation and argument passing that are important in distributed object systems. A subcontract implemented by subcontract layer 36 determines a specific quality of service for use by an object. A subcontract is uniquely identified by a subcontract identifier that is typically embedded in an object reference. A quality of service is a set of service properties. Among possible service properties that are selectable are qualities relating to server activation, security, transactions, filterability, and clean shut-down. Subcontracts are configured such that certain qualities of service are available. With predetermined qualities of service, the overhead associated with processing individual service properties is reduced. Realistically, only "reasonable" or commonly used combinations of service properties are supported with subcontracts. However, subcontracts may be created to meet the specific requirements of a given distributed object system.

The identification of an appropriate subcontract in subcontract layer 36 may be thought of as the identification of a desired function that is unique to that subcontract. For example, a marshal function or an unmarshal function is defined for each subcontract. A subcontract marshal function is used by a stub to marshal an object reference so that it may be transmitted to another address space, or domain. The object reference is typically processed by a transport mechanism in transport layer 38.

A transport mechanism such as T1, T2, etc., that is a part of the transport layer 38 is used to marshal and physically transport information to and from servant objects. Information, i.e. the object reference or the request, is converted into protocols appropriate to a given domain. By way of example, protocols may include, but are not limited to, Ethernet protocols and general inter-ORB protocols (GIOPs). In some uncommon cases, protocols may even entail the use of electronic mail to transmit instructions to be implemented on a server. After information is marshaled, the transport mechanism then transports information through any combination of an operating system, a device driver, or a network, that are all a part of hardware 70 used by the client side of a distributed object system.

While transport mechanisms require a conversion of information into a protocol appropriate to a given domain, some transport mechanisms do not require the encoding of information for different domains. One transport mechanism that does not require a conversion of information into a protocol appropriate to a domain other than the one on which information originates is termed a "door". Doors are essentially gateways between two different processes on the same host. The use of doors eliminates the need for a conversion of information into a canonical implementation in transport layer 38, as there is no need to encode information into a protocol that may be used by a different machine by virtue of the fact that information is remaining on the same host and therefore does not require a change of domain. Hence, information may simply be "flattened out," or marshaled into a stream that is not encoded for use by a different machine, and passed between the two processes on the host.

Once information is transported through hardware 70 used by the client side, the information is then transported to hardware 70 on the server side of a distributed object system. Once information is routed through hardware 70, the server side of a distributed object system invokes a transport mechanism such as T1, T2 etc. to receive information on an end point that is a part of transport layer 38. In the event that an end point is not created by transport layer 38, transport layer 38 provides the functionality needed for the end point to be created by subcontract layer 36. By way of example, a dedicated end point is typically created by subcontract layer 36, while cluster end points, which typically include network and TCP/IP end points, are typically created by transport layer 38. Regardless of whether end points are created by subcontract layer 36 or transport layer 38, end points "live in," i.e. are a part of, transport layer 38. End points are essentially ports that receive information from a different domain. After an end point in transport layer 38 receives information transported from a different domain, the end point then dispatches the information from transport layer 38 to subcontract layer 36. Subcontract layer 36 then dispatches the information to the skeleton and the servant. Such a technique for performing this three-level dispatch is described in above-referenced U.S. patent application Ser. No. 08/670,700.

Subcontract layer 36 provides the functionality to unmarshal at least some of the information it has received. That is, subcontract layer 36 unmarshals at least part of the request. Then, the request is dispatched to a skeleton 31 that transforms the request into an implementation specific format required by servant object 78. The skeleton 31 may either be a static skeleton 32 or a dynamic skeleton 30 as described above.

In general, a remote request is routed through the client side and the server side as described above. The method call 62 is received, method table dispatch layer 24 is used to identify an appropriate subcontract prior to the selection of a transport mechanism in transport layer 38 that marshals the request and prepares it for transport to another domain. Through hardware 70, the marshaled request is transported to the server side where it is received on an end point that is a part of transport layer 38. An appropriate end point receives information transported across a wire, and information is dispatched from transport layer 38 to subcontract layer 36, that provides the functionality to at least partially unmarshal the information it has received. The subcontract layer then dispatches the request to skeleton 31 that transforms the request into a specific format required by servant object 78. This path is shown by arrow 77, and is the path that may be taken by both remote and local requests.

However, if a client and a server are in a local process, i.e. both the client and the server are in the same process, the use of the path shown by arrow 77 as described above is unnecessarily complex. If it is known that the client and the server are in the same process, it is possible to shorten the invocation path, or flow path of a request for service. If a local process may be identified when an object reference is created, shortened flow paths, i.e. the paths represented by arrows 75 and 76, may be taken to send a request from a client to a server that are on the same host. The path represented by arrow 76 is more likely to be taken, as it uses subcontract layer 36 to identify an appropriate subcontract. However, in situations in which an appropriate subcontract does not need to be explicitly identified, the path represented by arrow 75 may be taken.

FIG. 5 will now be used to describe an embodiment of an object reference. As will be familiar to those skilled in the art, object references may take a variety of forms depending upon the location within the process that they are being held at any given time. However, by way of background, a representative object reference for use in a system that utilizes a low overhead implementation suite is illustrated in FIG. 5. In the implementation shown therein, object reference 150 includes a host identifier 152, a port designation 154, and an object key 156. Object key 156 includes a subcontract identifier 158, a server identifier 160, an implementation identifier 162, and a user key 164. Host identifier 152 denotes a particular computer in a network, while port designation 154 identifies the port of the selected computer that is to be used for communication. Object key 156 provides further identifying information used in order to locate a desired servant object on its host machine.

Server identifier 160 names a particular process or program in which the servant object resides, while user key 164 is a unique number or string used to locate the servant within the process named by server identifier 160. Subcontract identifier 158 is used to attach the protocol of a particular subcontract and its associated services with a servant, and implementation identifier 162 names an implementation of an interface that is to be used with that servant object.

DESCRIPTION OF THE PREFERRED EMBODIMENTS

The present invention relates to an object adaptor that is able to interact with and make use of a subset of all available features within a distributed object system through the use of subcontracts. Such an object adaptor need not necessarily supply an exhaustive fixed set of all features for all objects; to the contrary, such an object adaptor is designed to supply a smaller subset of features, resulting in a lower overhead for the CPU, quicker response, etc.

This low-overhead (or "light-weight") object adaptor provides various functionalities for use with objects in the context of subcontracts. By way of example, these functionalities include implementation activation, object reference creation and object invocation. The creation of object references and implementation activation in accordance with one embodiment of one aspect of the present invention will be described below with reference to FIGS. 6 through 11. The functionality relating to object invocation is discussed below with reference to an embodiment illustrated in FIGS. 12a, 12b and 13. In another aspect of the invention specialized data structures are provided that are arranged to facilitate efficient implementation of these functionalities.

As discussed above, the distributed object system may provide various features such as security or server activation for use by individual objects. These features are grouped into sets, and each set of one or more features is termed a subcontract. Each subcontract in turn is identified by a Subcontract Identifier, that may be a number or any other suitable identifier. For example, as illustrated in FIG. 2, Subcontract 1 may indicate that a clean shutdown should not be provided, that an authentication protocol such as MD5 should be used, that objects should have persistence and that server activation should be turned on. Thus, Subcontract 1 identifies four features available for an object, and whether these features are present (or turned on or off), are further qualified or have a specific value. A set of features is referred to herein as "a quality of service." Thus, each Subcontract Identifier identifies a specific quality of service. In the embodiment shown, the features that define a specific quality of service are identified in a list of name-value pairs.

Referring next to FIG. 2, a subcontract registry data structure 200 in accordance with one embodiment of the present invention will be described. The subcontract registry is used to store the information that associates a particular quality of service with a unique Subcontract Identifier and with its associated subcontract client representation create function. This table 200 is termed a subcontract registry in that it registers and makes available for searching all of the available subcontracts within the system. In this fashion, the table is advantageous in that it allows any number of implementations to be associated with a particular subcontract, as will be discussed below with reference to FIG. 3. It should be appreciated that although a predetermined number of permutations of features within a system are possible, the subcontract registry may only identify a subset of these possible subcontracts that have been implemented within the distributed object system. This table 200 may be implemented as a hash table, linked list or any other suitable data structure.

The subcontract registry 200 includes a Subcontract Identifier column 202, an associated quality of service list column 204, a subcontract client representation create function column 206, and location indicators to other functions 208. Each row of the table 210 is termed a Subcontract Meta Object and, by way of example, may be implemented as a C++ object. In the embodiment shown, a plurality of Subcontract Meta Objects 212, 214 and 216 are provided in the subcontract registry 200. The first Subcontract Meta Object 212 has a Subcontract Identifier of "1" and is thus identified as Subcontract 1. Subcontract 1 lists the following features for its quality of service: clean shutdown, security, persistence and server activation. The name-value pairs in this quality of service list indicates that a clean shutdown will not be implemented, that for security, an authentication protocol using MD5 will be used, that persistence is turned on and that server activation is present. In column 206, Subcontract 1 has a location indicator to its associated subcontract client representation create function, Client Rep Create 1. Column 208 includes a plurality of location indicators to various other functions associated with this Subcontract Meta Object such as location indicators to an unmarshal function, a destringify function and a bad server identifier handler.

Each name-value pair contains a name that indicates a particular feature of the system, and a value for that name indicating whether the feature is present or not or which aspect of the feature is to be used. For example, for the feature of transactions, its value may either be YES or NO, indicating whether this feature is turned on or off. However, for the security feature, its value may be a specific aspect of security such as authentication followed by a particular protocol to use such as MD5, Kerberos, or SPKM. The name field may be represented by a string variable, and the value field may also be a string or a number. Thus, a specific quality of service chosen by a developer for use with an object or objects within an application indicates the features that the developer wishes to take advantage of. Because these features may be unique to each object, it is necessary to have a specific create function for each quality of service that will create an object location indicator to the particular object being referenced.

The second illustrated Subcontract Meta Object 214 is the Subcontract Meta Object for Subcontract 2. The quality of service list for this subcontract indicates that a clean shutdown will be implemented, that for security, an authentication protocol using MD5 will be used, that persistence is turned on and that server activation is present. The Subcontract Meta Object 216 indicates that for Subcontract 3 it will allow clean shutdowns, that for security, an authentication protocol using MD5 will be used, that persistence is present and that server activation will also be turned on.

The subcontract registry 200 will typically have a group of associated functions that are used to organize and access the registry. By way of example, the associated functions may include an Add function, a Find function, a Get First function and a Get Next function. The Add function may be used to add a new quality of service to the table. In the described embodiment, the Add function takes as arguments a Subcontract Identifier and a Subcontract Meta Object. A Find function takes as an argument a Subcontract Identifier and returns the Subcontract Meta Object associated with that identifier. The functions Get First and Get Next return the appropriate Subcontract Meta Object and are used to iterate over the entire table and thus search it completely for a particular quality of service. This subcontract registry may be used in the following manner. When a client wishes to make a call to a particular server object, the subcontract registry may be used to look up the Subcontract Identifier associated with that server object and then to call the appropriate subcontract client representation create function in order to create an object reference to the particular server object using the appropriate features.

Each object in the system is associated with an implementation definition. Each implementation definition for an object includes such information as the name of the implementation, which subcontract to use in creating the object, the Interface Identifier for the object, a set of call back functions and skeleton information. These call back functions may be stored in an object. Such information for an implementation definition may be stored in a wide variety of manners. By way of example, such information may be stored in an implementation registry table.

FIG. 3 shows an implementation registry 250 in accordance with one embodiment of the present invention. The implementation registry has entries corresponding to various implementation definitions. Through the use of this table, an implementer of an object server will be able to provide multiple, different implementations of a single ORB object type in the same object server. That is, one object type may have various implementations that are identified by distinct Implementation Identifiers. Each implementation defines the behavior for all of the operations and attributes of the interface that it supports. In other words, each interface may have many implementations. Therefore, each Implementation Identifier represents a distinct implementation for an object that uses a particular subcontract. And each implementation may use a different subcontract by way of a subcontract location indicator in the implementation registry as will be discussed below. In this fashion, the implementation registry is advantageous in that it allows an invoking function to choose a particular implementation which in turn may use a desired subcontract of the subcontract registry.

Each implementation definition represents an entry in the implementation registry that contain location indicators to the different data stored. The implementation registry 250 includes an Implementation Identifier column 252 that names the implementation, a Subcontract Meta Object column 254, an Interface Identifier column 256, a column 257 for a Ready Flag, a call back functions column 258, and a skeleton information column 259. The Implementation Identifier is a name for the implementation that is supplied by the developer when an implementation definition is created. The Subcontract Meta Object is a location indicator from a particular implementation definition to a Subcontract Meta Object contained in the subcontract registry 200. The Interface Identifier is a fixed globally unique name of the type of a particular interface. The Ready Flag will be set for a particular implementation definition when the implementation has been prepared as will be described below with reference to FIG. 8. If the Ready Flag is not set, then the dispatch function may have to wait temporarily until the implementation is ready, as described below with reference to FIGS. 12a and 12b, and specifically in step 727 of FIG. 12b. The skeleton information provides information and functions for use by the skeleton associated with this implementation. The call back functions are a set of functions associated with each implementation. A wide variety of call back functions may be associated with a particular implementation. By way of example, the call back functions Lookup, Post Invoke, Revoke, Deactivate and Shutdown will be illustrated.

The Lookup function takes as an argument a User Key and returns a location indicator to a servant, which may be NULL if no corresponding object exists. If the object is found the invocation continues. If not, an exception is returned to the client. The User Key is reference data supplied by the developer and may be any arbitrary data. The User Key forms part of the object reference as will be explained below with reference to FIG. 5. The Post Invoke function takes as an argument a user key and returns no value. It may execute various operations that the developer wishes to perform after the invocation of an object. The Revoke function takes as an argument the User Key and performs the function of preventing an object from being referred to. The Deactivate function takes as arguments the User Key and a deactivate closure. The deactivate closure is a procedure that enables the ORB to do some internal clean up once the object has been deactivated by the body of the deactivate function. Essentially, the deactivate function itself serves to make the object inaccessible. The Shutdown function is used to shutdown a particular implementation definition by removing all servant objects if necessary. Each set of call back functions 258 associated with an implementation definition may be represented in an object that contains these functions.

Referring again to FIG. 3, shown in particular in the implementation registry 250 is an implementation definition 262. This definition is for a PRINTER implementation of the interface PRINTER INTERFACE and it has a location indicator 266 to Subcontract 1 of the subcontract registry. It also has five unique call back functions, and a unique skeleton dispatch function. Also shown is an implementation definition 264 for a MODEM implementation that has a location indicator to its corresponding subcontract, and that implements the interface identified by MODEM INTERFACE.

Associated with this implementation registry 250 are various functions used to organize and access the registry. By way of example, the function Add may be used to add an implementation definition with a particular Implementation Identifier to the implementation registry. The function Find may take as an argument an Implementation Identifier and will search through the registry in order to return the corresponding implementation definition.

Figure 4:
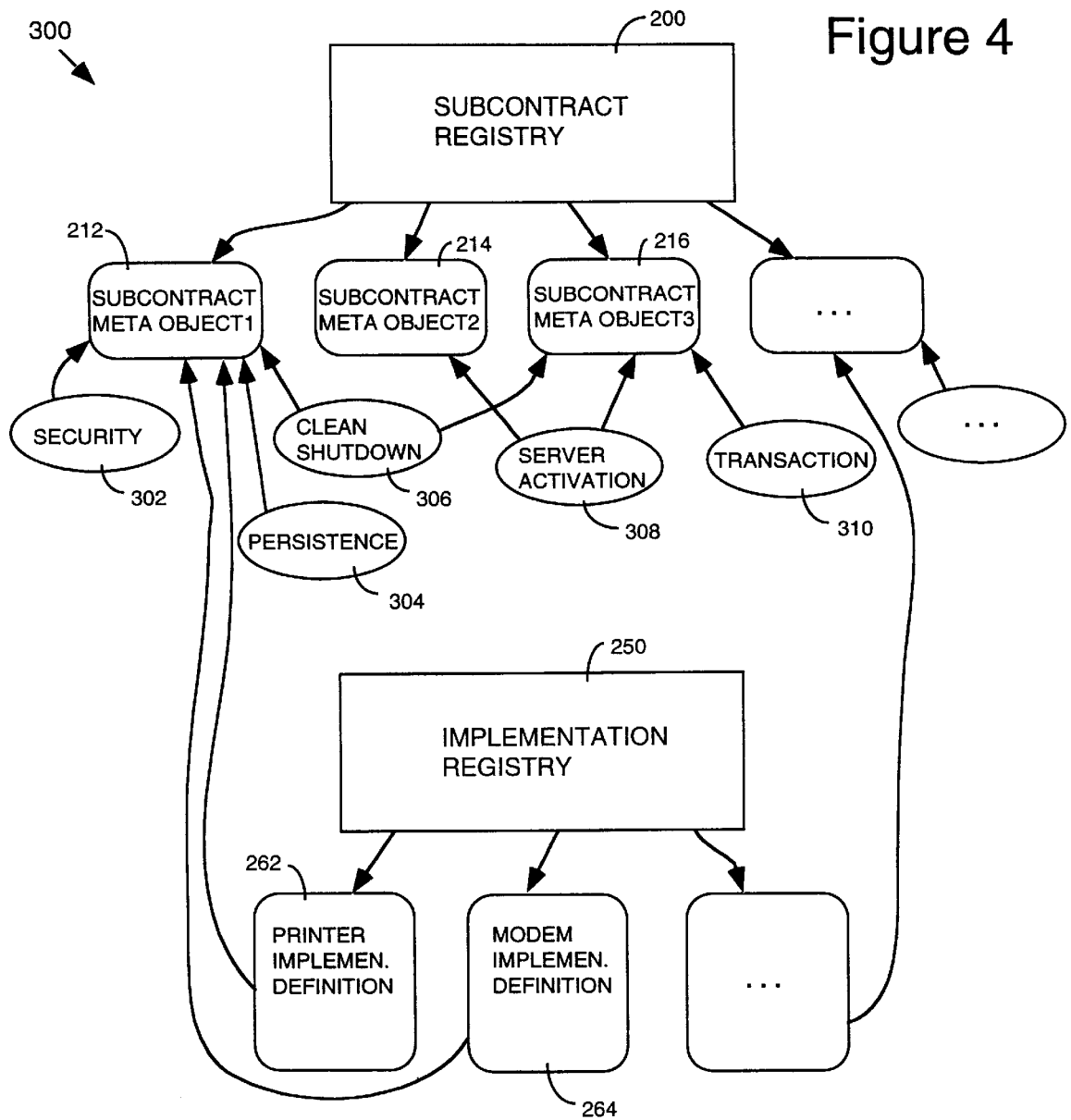
FIG. 4 shows graphically the interaction between the subcontract registry and implementation registry tables of FIGS. 2 and 3.

FIG. 4 at 300 shows how the subcontract registry 200 and the implementation registry 250 interact with one another. The subcontract registry 200 registers various subcontracts by having Subcontract Meta Object entries such as 212, 214 and 216, etc. Each of these Subcontract Meta Objects identifies a unique set of features of the system. For example, Subcontract Meta Object 1 identifies Subcontract 1 that identifies the features security 302, persistence 304 and clean shutdown 306. Similarly, Subcontract 2 identifies the feature server activation 308. Subcontract 3 identifies the features clean shutdown 306, server activation 308 and transactions 310.

The interaction between the two takes place as follows. The implementation registry 250 identifies various implementation definitions such as PRINTER 262 and MODEM 264. Each of these implementation definitions references a single one of the Subcontract Meta Objects through, for example, link 266. It may be possible for a particular Subcontract Meta Object to be referenced by more than one implementation definition. For example, both the PRINTER and the MODEM definitions reference Subcontract 1 through Subcontract Meta Object 1.

FIG. 5 at 150 shows the object reference described above in the overview. It should also be noted that the subcontract Identifier 158 identifies not only which subcontract the object will utilize but also identifies a particular Subcontract Meta Object in the subcontract registry through column 202 of FIG. 2. The Implementation Identifier 162 identifies the name of the implementation for this object and also indicates an implementation definition by way of column 252 of the implementation registry of FIG. 3.

Figure 6:
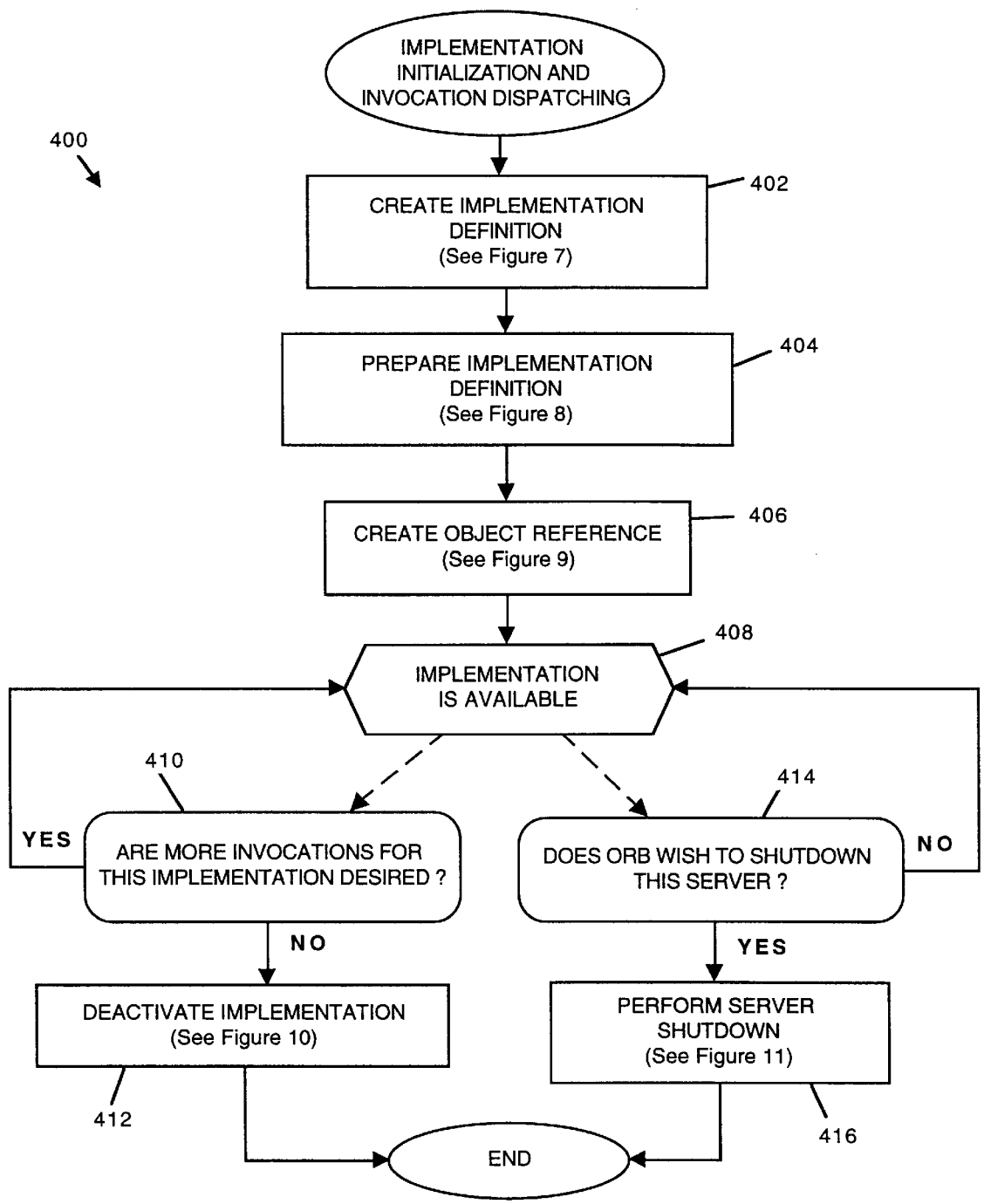
FIG. 6 is a flowchart for implementation initialization and invocation dispatching within a distributed object system according to one embodiment of the present invention.

FIG. 6 shows a procedure 400 that describes the typical steps needed to create objects for which a server may dispatch requests. The steps of creating an implementation definition and preparing it typically occur when the server process is initialized. Object references are created in the server and given to the client in response to requests on other objects which are usually referred to as factory objects. Factory objects are usually well-known objects that are created when a server is installed, or else when it initializes. These well-known objects are typically registered with a naming service so that clients can find them. Thus, there are preferably two cases in which step 406 below is called: as part of the server installation or initialization, or in an operation on a factory object implemented in the server. An implementation definition is created by filling out a row of the implementation registry, that will then be accessed by an invocation. Once ready, this implementation may receive invocations upon its objects. If the implementation is no longer able to receive invocations, it may be deactivated, as discussed below with reference to FIG. 10, or the ORB may wish to shutdown as discussed below with reference to FIG. 11.

In a first step 402 of FIG. 6 the create implementation definition function is called. This function will take as arguments a desired quality of service list, a name for an implementation and skeleton information, and will return an implementation definition. This step will be explained in more detail below with reference to FIG. 7. In step 404 a prepare implementation definition function is called. This function takes as arguments an implementation definition and a set of call back functions for that implementation definition in order to install these functions in the implementation definition. It will be explained in more detail below with reference to FIG. 8. Once the implementation is ready, in step 406 a create object reference function is called. This function takes as arguments an implementation definition and the User Key and returns an object reference. This create object reference function produces an object reference to a servant that may or may not exist according to the subcontract specified. This step will be explained in more detail below with reference to FIG. 9.

Once an object has been created by producing its object reference the object is available for use. At this point the client may make use of the server object and other processing may occur. Thus step 408 indicates a wait state in which the system continues processing of an application until the occurrence of two possible situations. These situations are described in steps 410 and 414. Step 410 checks whether any more invocations for this particular implementation are desired. In other words, if the developer no longer has any use for this object it will be removed in step 412. Otherwise, the system continues processing and uses this implementation. In step 412 the deactivate implementation function is called. This function takes as an argument an implementation definition and removes that implementation. The deactivate implementation function will be explained in more detail below with reference to FIG. 10.

Occasionally, the object request broker (ORB) may wish to shut down the server. If not, then the system continues processing as in step 408. However, if the system is to be shut down then in step 416 the server shutdown function is called. This server shutdown function will be explained in more detail below with reference to FIG. 11.

Figure 7:
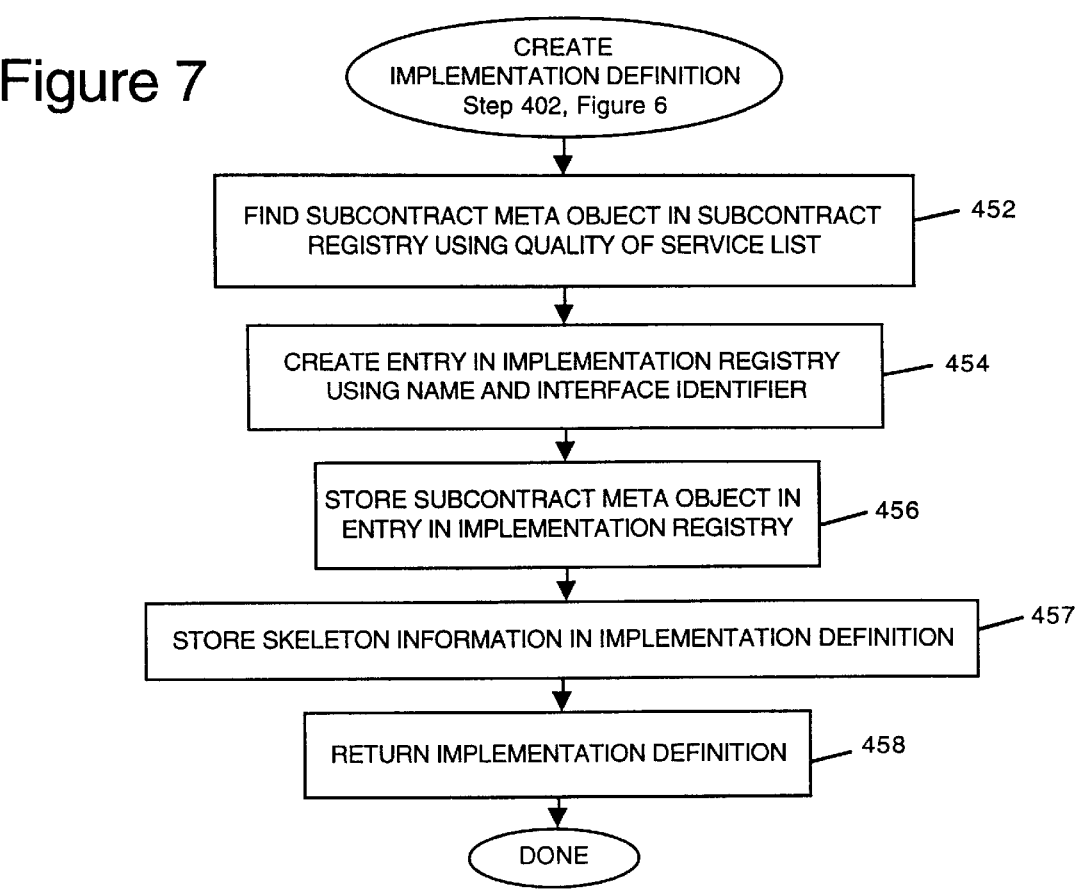
FIG. 7 shows the create implementation definition step of FIG. 6.

Referring next to FIG. 7, a create implementation definition function suitable for implementing step 402 in FIG. 6 will be described in more detail. The create implementation definition function takes as arguments a quality of service list, a name for an implementation and an Interface Identifier. In step 452 the desired quality of service list is used to search through the subcontract registry and match the quality of service list of an existing Subcontract Meta Object. This step may be performed by searching each entry in the subcontract registry using the subcontract registry functions as discussed above. In step 454 an entry is created in the implementation registry using the Interface Identifier and the name for the implementation as the Implementation Identifier. In step 456 the Subcontract Meta Object field for this new entry is updated to point to the identified Subcontract Meta Object found in step 452. Next, in step 457 all skeleton information is stored in this new entry, including the skeleton dispatch function unique for this implementation definition. After this step this new implementation definition is returned and this function is done and control returns to step 404 of FIG. 6.

Figure 8:
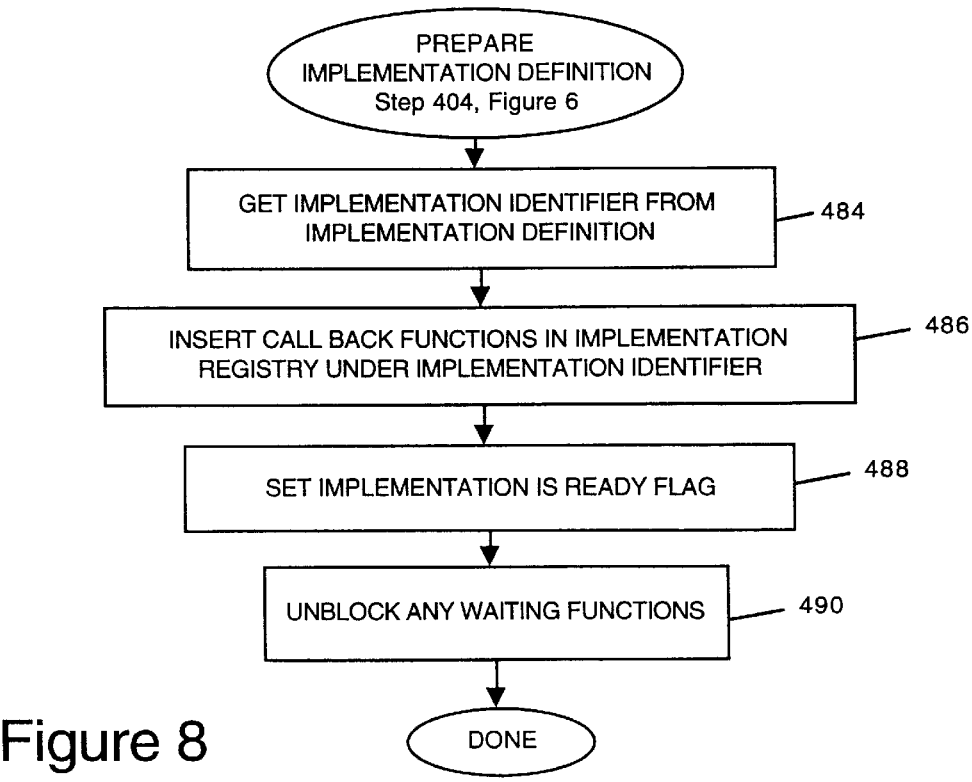
FIG. 8 shows the prepare implementation definition step of FIG. 6.

Referring next to FIG. 8, a prepare implementation definition function suitable for implementing step 404 in FIG. 6 will be described in more detail. This function takes as arguments an implementation definition and a set of associated call back functions. In step 484 the implementation definition is used to determine the corresponding Implementation Identifier. Next, in step 486 these call back functions are inserted in the implementation registry at the entry corresponding to the found Implementation Identifier. In step 488 the implementation Ready Flag is set to YES to indicate that this implementation is now ready for use. Because the implementation is now ready, in step 490 any waiting procedures are now unblocked and may use this implementation. For example, step 727 of the invocation procedure of FIG. 12b must wait until the implementation is ready. After this step 490 the function is done and control returns to step 406 of FIG. 6.

Referring next to FIG. 9, a create object reference function suitable for implementing step 406 in FIG. 6 will be described in more detail. This function takes as arguments an implementation definition and a User Key. It will eventually create and return an object reference by using the subcontract client representation create function described below. In step 502 the implementation definition is used to reference its corresponding entry in the implementation registry in order to produce the corresponding Subcontract Meta Object location indicator that points to the appropriate Subcontract Meta Object in the subcontract registry. In step 504 the subcontract client representation create function corresponding to the entry in the table for this found Subcontract Meta Object is returned. In step 506 this subcontract client representation create function is called with the User Key and the received implementation definition as arguments. This client representation create function creates an object reference for a servant (that may or may not yet exist) corresponding to the Interface Identifier and named Implementation Identifier of the received implementation definition. Because this client representation create function is unique to each subcontract, this step utilizes the appropriate features of the corresponding subcontract in order to return the object reference. In step 508 this object reference created is returned and the function is done and control returns to step 408 of FIG. 6.

Referring next to FIG. 10, a deactivate implementation function suitable for implementing step 412 in FIG. 6 will be described in more detail. This function take as an argument an implementation definition. In step 520 the implementation definition is used to produce the corresponding Implementation Identifier. In step 522 the entry in the implementation registry corresponding to this Implementation Identifier is removed. This removal effectively prevents this implementation of an interface from being used because the implementation is no longer present in the implementation registry. After this step the function is done and control returns to the end of FIG. 6.

Referring next to FIG. 11, a shut down function suitable for implementing step 416 in FIG. 6 will be described in more detail. This shutdown function is used to shutdown all implementation of objects within the ORB. Step 540 introduces a looping structure that will step through all entries in the implementation registry. An index J is first set equal to the first entry in the implementation registry. Upon each iteration of this loop, the index J will be set to the next entry in the table. Step 540 also tests whether the last entry has been processed, if so, then this function is done. In step 542 the shutdown call back function corresponding to a particular implementation definition at entry J is called in order to shutdown this particular implementation. Once all implementations have been shutdown, then the ORB may safely cease processing. After this step the function is done and control returns to the end of FIG. 6. Now that an embodiment of the create object reference function of FIG. 6 has been described, the dispatch function will be described.

Figure 12A:
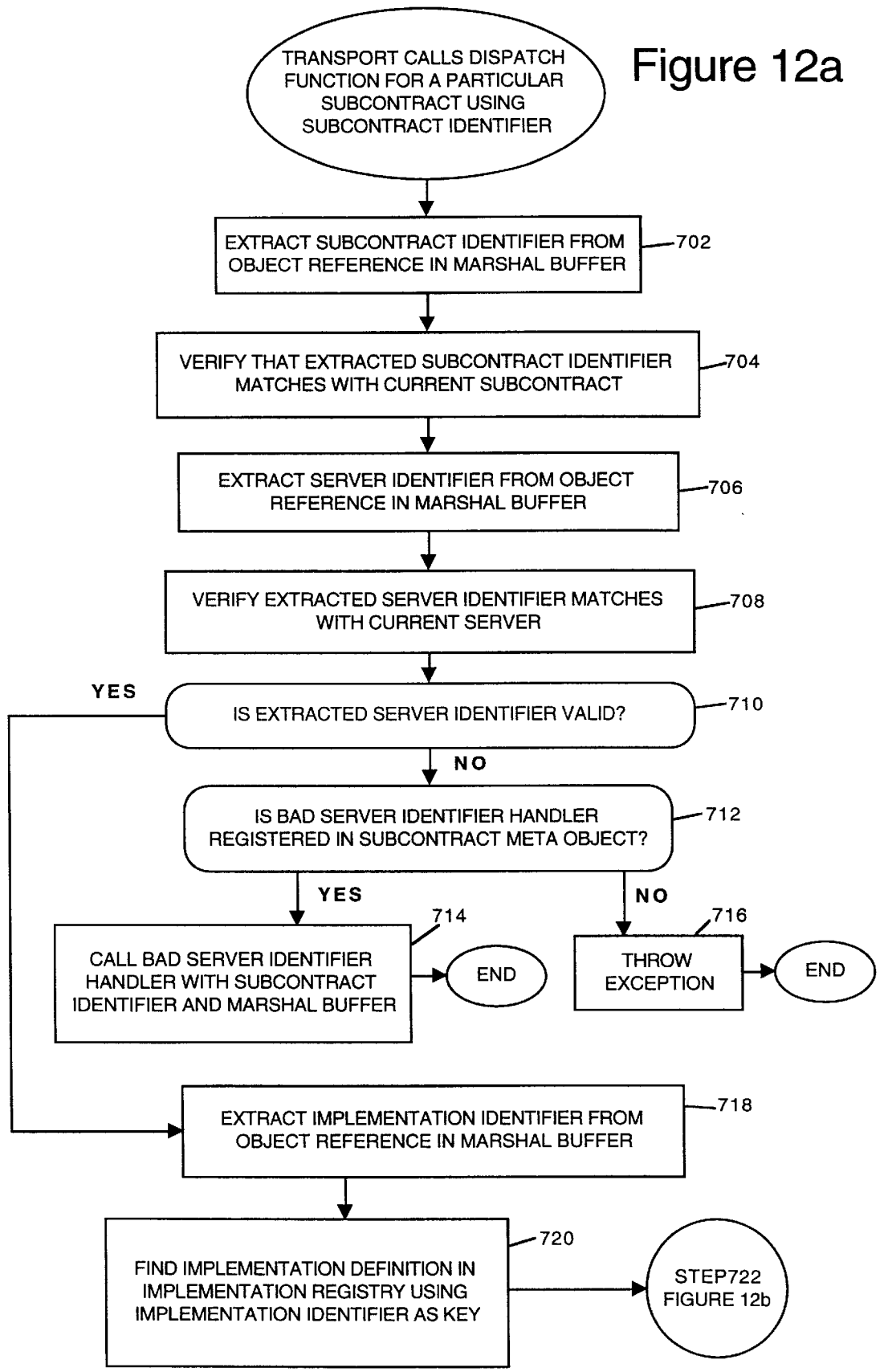
FIGS. 12a and 12b are a flowchart for invoking a method of a server object using a particular subcontract.
Figure 12B:
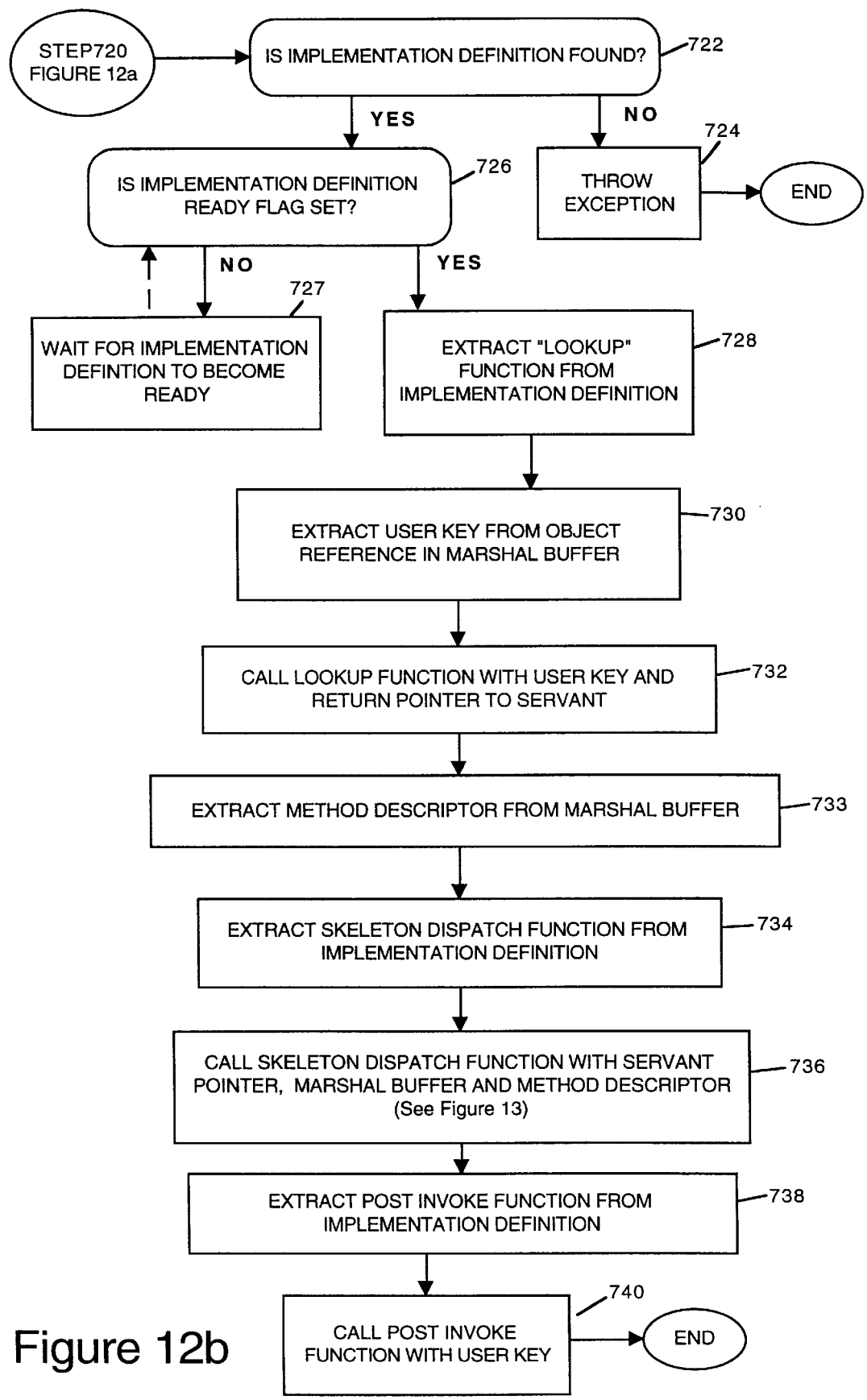
Figure 13:
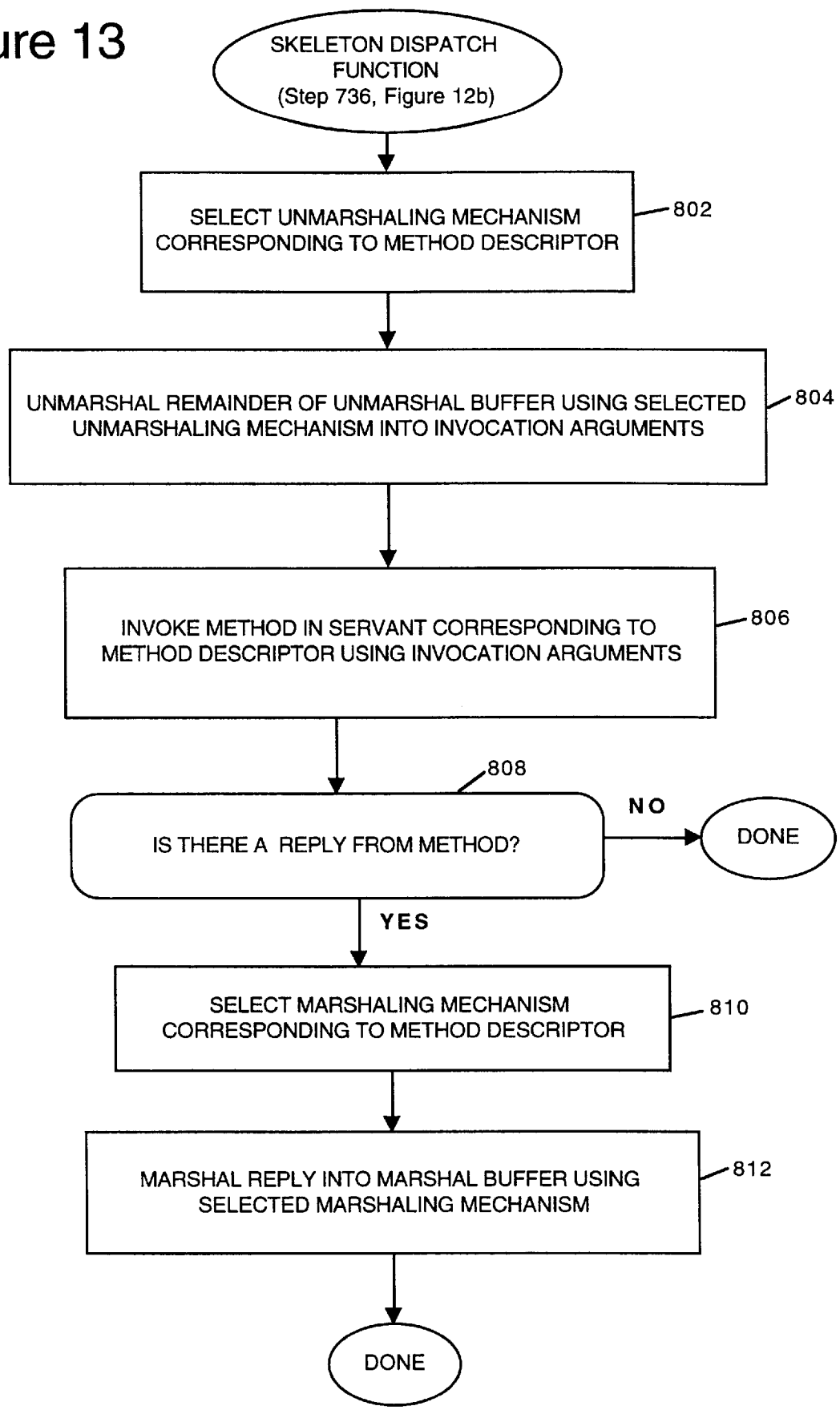
FIG. 13 is the skeleton dispatch function step of FIG. 12b.

FIGS. 12a, 12b and 13 illustrate an embodiment of a procedure for performing object invocation. This procedure makes use of the implementation and subcontract registries in order to take advantage of subcontracts in accordance with one of the goals of the present invention. Object invocation is the process by which a client invokes an operation or accesses an attribute of a server object, a call is made through the ORB to the server object, the operation is invoked upon the server object, and a result is returned to the client (if required). Once the mechanisms on the client side have processed this request and passed the request to the client transport layer, the client transport layer sends the request to the server's transport layer. FIGS. 12a, 12b and 13 describe how the transport layer calls a particular dispatch function of a subcontract in order to invoke the server object. Each subcontract has a unique dispatch function that performs the steps that will be described below. The procedure will use the implementation registry in order to find the appropriate lookup function and the appropriate skeleton dispatch function for that implementation. The subcontract registry will also be used to provide a bad server identifier handler function corresponding to a particular subcontract if necessary.

FIG. 12a begins by having the transport layer call the dispatch function for a particular subcontract using the subcontract identifier. Due to the client's invocation on the object reference, the transport layer has been provided with a marshal buffer that contains among other information, the object key for the server object. This object key contains information as shown in FIG. 5. The marshal buffer also contains the name of the method to be invoked upon the server object and any necessary arguments. As the subcontract identifier is contained within the object key as shown in FIG. 5, the transport layer is able to "peek" at this subcontract identifier in order to determine which subcontract is appropriate and which dispatch function should be called.

In step 702 this subcontract identifier is extracted from the object reference in the marshal buffer. The process of extraction means that this information is taken from the marshal buffer and is no longer present in the marshal buffer. Next, in step 704 this extracted subcontract identifier is compared with the current subcontract that is being utilized in order to verify that the appropriate subcontract is being used. As described above, during object development, an application developer has associated a particular subcontract with an object by using a subcontract identifier.

In step 706 the server identifier is extracted from the object reference in the marshal buffer. The server object that is the subject of the invocation is present within a particular server process on a host computer; thus, it is important to verify that this server identifier matches with the identifier of the current server. In step 708 this extracted server identifier is compared with the identifier of the current server in order to determine if the object reference is referencing the appropriate server process. Step 710 determines if the extracted server identifier is valid and does match with the current server. If not, this indicates that the server identifier is invalid and appropriate action should be taken. This action may be performed by a bad server identifier handler function. Step 712 determines if an appropriate bad server identifier handler is registered in the subcontract meta object. Because the subcontract identifier has already been extracted from the object reference, this step may be performed by using the subcontract registry of FIG. 2. The subcontract identifier acts as a key to a particular row of this table that allows a search of column 208 in order to determine if the bad server identifier handler is present. If the handler is not present, then the system throws an exception relating to this situation in step 716 and the dispatch function ends. If, however, the handler is registered in the subcontract meta object, then in step 714 this bad server identifier handler is called with the subcontract identifier and the marshal buffer as arguments. After this step, the dispatch function ends.

Returning now to step 710, if the extracted server identifier does match with the current server, then control moves to step 718. In step 718 the implementation identifier is extracted from the object reference in the marshal buffer. In step 720 this extracted implementation identifier is used as a key to the implementation registry of FIG. 3 in order to find the appropriate implementation definition. The use of the implementation registry is explained above with reference to FIG. 3. This step 720 may be performed by searching through column 252 of the implementation registry of FIG. 3 in order to determine if the implementation identifier is present in the table. If in step 722 it is determined that the implementation definition is not found then in step 724 an exception is thrown relating to this condition and the dispatch function ends. If however, the implementation definition is found then the operation may proceed with use of the definition.

However, even if an implementation definition is found, it may not necessarily be ready for use. An implementation definition is ready, or prepared, if the prepare implementation definition step 404 of FIG. 6. has been executed. Once this step has been executed, the Ready Flag will be set. Step 726 tests whether this Ready Flag has been set. If not, then in step 727 the dispatch function enters a wait state in which it waits for the implementation definition to become ready. Once the implementation definition is ready then control moves from step 726 to step 728. In step 728 the lookup function from the implementation definition is extracted. This lookup function is one of the call back functions of column 258 of FIG. 3 and will be used to produce a local location indicator to the servant. In step 730 the User Key is extracted from the object reference in the marshal buffer. Next, in step 732 the lookup function is called with the User Key as an argument. Once this function has executed it will return a location indicator to the servant. This location indicator may be implemented in the local language of the server. By way of example, this location indicator may be a C++ object pointer that references the servant C++ object.

Now that a local location indicator has been obtained to the servant object the dispatch function is ready to execute the appropriate method upon the servant object that was originally requested by the client. In step 733 the method descriptor is extracted from the marshal buffer. The method descriptor is a representation from the client's point of view of that particular method name defined upon the servant that the client wishes to invoke. In step 734 the skeleton dispatch function is extracted from the implementation definition. This skeleton dispatch function may be found in the implementation registry in column 259 of FIG. 3. In step 736 this skeleton dispatch function is called with the arguments servant location indicator, marshal buffer and the method descriptor. This function will be explained in more detail below with reference to FIG. 13. The skeleton dispatch function achieves the result of executing the method upon the servant that the client requested be performed. Once this operation has taken place the invocation of the server object by the client has finished. However, an additional function may be executed. The post invoke function is a developer defined function for each implementation that achieves a functionality that the developer wishes. In step 738 this post invoke function is extracted from the implementation definition. In step 740 this post invoke function is called with the User Key as an argument. The post invoke function may be used by the developer to perform a particular action after the invocation of an object. For example, Lookup/Post-Invoke may count the number of active invocations on a particular server. This is useful for managing the life cycle of servant objects.

Referring next to FIG. 13, a skeleton dispatch function suitable for implementing step 736 in FIG. 12b will be described in more detail. This function first begins in step 802 in which an unmarshaling mechanism is selected based upon the method descriptor. The unmarshaling mechanism may be a sequence of code that is selected by a switch statement for example. As other information has already been extracted from the marshal buffer, the only information remaining in the marshal buffer at this point are the arguments of the method to be called. In step 804 the selected unmarshaling mechanism is used to unmarshal the remainder of the marshal buffer into the invocation arguments. In step 806 the method descriptor is used to invoke the method defined upon the servant using the invocation arguments. This step has the effect of executing the method that was originally requested by the client. It is possible that this method returns no value at all and performs other functions, or may be that the method returns a value to the client. Step 808 determines if the method produces a reply. If not, then this function is done. If so, then control moves to step 810. In step 810 an appropriate marshalling mechanism is selected corresponding to the method descriptor. In step 812 the selected marshalling mechanism is used to marshal the reply into the marshal buffer. At this point the marshal buffer is ready to be returned through the transport layer to the client. After this step, this function is done and control returns to step 738 of FIG. 12*b*.

The present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 14:
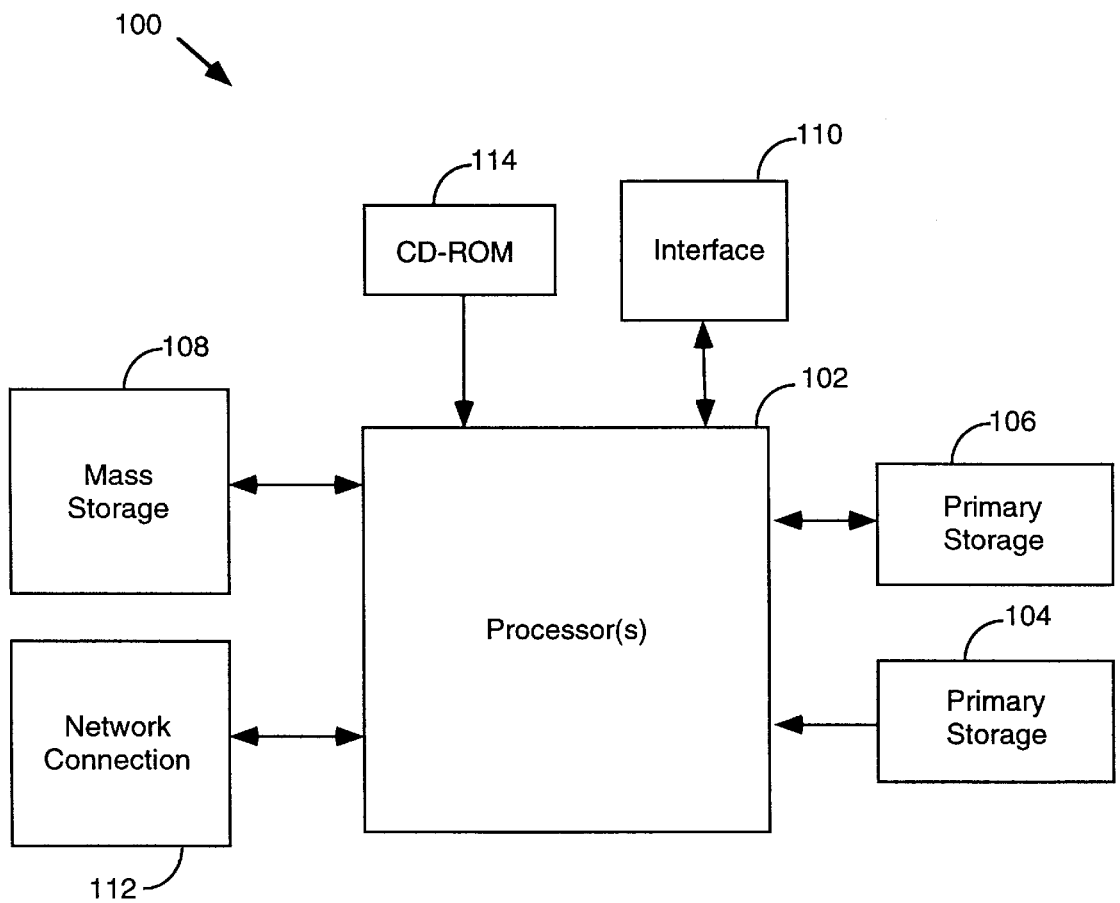
FIG. 14 is a typical computer system suitable for implementing the present invention.

FIG. 14 illustrates a typical computer system in accordance with an embodiment of the present invention. The computer system 100 includes any number of processors 102 (also referred to as central processing units, or CPUs) that are coupled to storage devices including primary storage 106 (typically a random access memory, or RAM), primary storage 104 (typically a read only memory, or ROM). As is well known in the art, primary storage 104 acts to transfer data and instructions uni-directionally to the CPU and primary storage 106 is used typically to transfer data and instructions in a bi-directional manner. Both of these primary storage devices may include any suitable of the computer-readable media described above. A mass storage device 108 is also coupled bi-directionally to CPU 102 and provides additional data storage capacity and may include any of the computer-readable media described above. The mass storage device 108 may be used to store programs, data and the like and is typically a secondary storage medium such as a hard disk that is slower than primary storage. It will be appreciated that the information retained within the mass storage device 108, may, in appropriate cases, be incorporated in standard fashion as part of primary storage 106 as virtual memory. A specific mass storage device such as a CD-ROM 114 may also pass data uni-directionally to the CPU.

CPU 102 is also coupled to an interface 110 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally may be coupled to a computer or telecommunications network using a network connection as shown generally at 112. With such a network connection, it is contemplated that the CPU might receive information from the network, or might output information to the network in the course of performing the above-described method steps. The above-described devices and materials will be familiar to those of skill in the computer hardware and software arts.

Although the foregoing invention has been described in some detail for purposes of clarity of understanding, it will be apparent that certain changes and modifications may be practiced within the scope of the appended claims. For instance, the present invention may be practiced within any suitable distributed object environment. And the subcontract registry and implementation registry tables may be represented in different forms or may even be combined into one data structure while still accomplishing the goals of the present invention. Also, although the create object reference and object invocation flow charts describe one set of functions that utilize the notion of a subcontract within the described low overhead object adaptor, it is contemplated that other similar functions may use subcontracts through a form of the subcontract registry and implementation registry tables as described above. Therefore, the described embodiments should be taken as illustrative and not restrictive, and the invention should not be limited to the details given herein but should be defined by the following claims and their full scope of equivalents.

We claim:

1. A computer-implemented method of creating an object reference for a distributed server object within a distributed object computing system, the distributed object computing system providing a plurality of features for use in invoking the implementations of server objects, the method comprising:

receiving a request that an object reference be created for a server object;

identifying a subcontract entry in a feature registry, the feature registry including a plurality of subcontract entries each associated with a feature set including at least one of the plurality of features, the subcontract entry being associated with the server object reference to be created and being arranged to identify a feature set having at least one feature to be utilized in invoking an implementation of the server object;

identifying a create function associated with the identified subcontract entry, the create function being responsible for creating the server object reference using the feature set identified by the identified subcontract entry;

invoking the create function in order to produce an object reference for the server object using the identified feature set; and returning the produced object reference.

2. A method as recited in claim 1 wherein each feature set includes at least one feature name-value pair, wherein each feature name-value pair includes:

a feature name that identifies an associated one of the plurality of features; and a value that further qualifies the associated feature.

3. A method as recited in claim 1 wherein invoking the identified create function includes passing a user-identified key to the create function.

4. A method as recited in claim 1 wherein the distributed object computing system also utilizes an implementation registry, the implementation registry including a plurality of implementation definitions, each implementation definition including an implementation identifier and a subcontract location indicator that indicates a unique subcontract entry in the feature registry, and wherein the method further comprises:

creating an implementation definition for the implementation of the server object to be created.

5. A computer-implemented method of invoking an object method defined on a distributed server object within a distributed object computing system, the distributed object computing system utilizing an implementation registry having a plurality of entries, each entry including an implementation definition defining an implementation for an interface within the distributed object computing system, an implementation identifier, and associated functions, the method comprising:

receiving a marshal buffer containing an object reference to the server object;

peeking at a subcontract identifier in the object reference in the marshal buffer, the subcontract identifier identifying a unique dispatch function of a subcontract used for invoking the server object;

calling the unique dispatch function of the subcontract identified by the subcontract identifier in the object reference;

extracting an implementation identifier from the object reference in the marshal buffer;

determining an implementation definition within the implementation registry by using the extracted implementation identifier as a key;

calling a lookup function of the implementation definition in order to produce a location indicator to the server object; and calling a skeleton dispatch function of the implementation definition in order to invoke the object method defined on the server object.

6. A method as recited in claim 5 further comprising:

extracting the subcontract identifier from the object reference in the marshal buffer; and verifying that the extracted subcontract identifier matches a current subcontract.

7. A method as recited in claim 5 further comprising:

extracting a server identifier from the object reference in the marshal buffer;

determining if the extracted server identifier matches a current server; and wherein when it is determined that the extracted server identifier does not match a current server, the method further comprises calling a bad server identifier handler function that is identified in a subcontract registry.

8. A method as recited in claim 5 wherein calling a lookup function includes:

extracting the lookup function from the determined implementation definition; and extracting a user key from the object reference in the marshal buffer.

9. A method as recited in claim 5 wherein calling a skeleton dispatch function includes:

extracting the skeleton dispatch function from the determined implementation definition; and extracting a method descriptor from the object reference in the marshal buffer.

10. A feature registry data structure embodied in a computer-readable medium, the feature registry used for invoking implementations of server objects within a distributed object computing system, the distributed object computing system providing a plurality of features for use in the implementation of server objects, the feature registry including a plurality of subcontract entries, each subcontract entry comprising:

an implementation identifier naming an implementation of an associated server object;

an interface identifier naming an interface of the associated server object that defines operations for the associated server object;

at least one feature identifier, the feature identifier identifying one of the plurality of features that are provided by the distributed object computing system in conjunction with the subcontract entry of which the feature identifier is a part; and a create function for creating an object reference for the associated server object in a manner that utilizes the feature identified by the feature identifier within a context that is appropriate in view of the feature identifier, the create function being unique to the subcontract entry of which the create function is a part.

11. A feature registry data structure as recited in claim 10 wherein each feature identifier includes a feature name-value pair, wherein each feature name-value pair includes:
   a feature name that identifies an associated one of the plurality of features; and
   a value that further qualifies the associated feature.

12. A subcontract registry data structure embodied in a computer-readable medium, the subcontract registry used for creating object references for server objects within a distributed object computing system, the distributed object computing system providing a plurality of features for use in the creation of object references for server objects, the subcontract registry including a plurality of subcontract objects, each subcontract object comprising:
   a subcontract identifier identifying the subcontract object to which it corresponds;
   at least one feature identifier, the feature identifier identifying one of the plurality of features that are provided by the distributed object computing system; and
   a create function associated uniquely with each subcontract object, the create function used to create and return an object reference for a server object by way of using the features identified by the feature identifiers associated with each subcontract object.

13. A subcontract registry data structure as recited in claim 12 wherein each feature identifier of each subcontract object is a feature name-value pair, wherein each feature name-value pair includes:
   a feature name that identifies an associated one of the plurality of features; and
   a value that further qualifies the associated feature.

14. A subcontract registry data structure as recited in claim 12 wherein each subcontract object further comprises a bad server identification handler function used when it is determined that a server identification of a particular object reference does not match with a server process.

15. A computer apparatus for use in invoking an implementation of a server object within a distributed object computing system, the computer apparatus comprising:
   a processing unit;
   an input/output device coupled to the processing unit; and
   a storage device in communication with the processing unit, the storage device including a feature registry data structure used for invoking implementations of server objects within the distributed object computing system, the distributed object computing system providing a plurality of features for use in the implementation of server objects, the feature registry including a plurality of subcontract entries, each subcontract entry including
      an implementation identifier naming an implementation of an associated server object,
      an interface identifier naming an interface of the associated server object that defines operations for the associated server object,
      at least one feature identifier, the feature identifier identifying one of the plurality of features that are provided by the distributed object computing system in conjunction with the subcontract entry of which the feature identifier is a part, and
      a create function for creating an object reference for the associated server object in a manner that utilizes the feature identified by the feature identifier within a context that is appropriate in view of the feature identifier, the create function being unique to the subcontract entry of which the create function is a part.

16. A computer program product comprising a computer-usable medium having computer-readable code embodied thereon for creating an object reference for a distributed server object within a distributed object computing system, the distributed object computing system providing a plurality of features for use in invoking the implementations of server objects, the computer program product comprising computer-readable program code for effecting the following within the computer system:
   receiving a request that an object reference be created for a server object;
   identifying a subcontract entry in a feature registry, the feature registry including a plurality of subcontract entries each associated with a feature set including at least one of the plurality of features, the subcontract entry being associated with the server object reference to be created and being arranged to identify a feature set having at least one feature to be utilized in invoking an implementation of the server object;
   identifying a create function associated with the identified subcontract entry, the create function being responsible for creating the server object reference using the feature set identified by the identified subcontract entry;
   invoking the create function in order to produce an object reference for the server object using the identified feature set; and
   returning the produced object reference.

17. A computer program product as recited in claim 16 wherein each feature set includes at least one feature name-value pair, wherein each feature name-value pair includes:
   a feature name that identifies an associated one of the plurality of features; and
   a value that further qualifies the associated feature.

18. A computer program product as recited in claim 16 wherein invoking the identified create function includes passing a user-identified key to the create function.

19. A computer program product as recited in claim 16 wherein the distributed object computing system also utilizes an implementation registry, the implementation registry including a plurality of implementation definitions, each implementation definition including an implementation identifier and a subcontract location indicator that indicates a unique subcontract entry in the feature registry, wherein the computer program product further comprises program code for creating an implementation definition for the implementation of the server object to be created.

20. A computer program product comprising a computer-usable medium having computer-readable code embodied thereon for invoking an object method defined on a distributed server object within a distributed object computing system, the distributed object computing system utilizing an implementation registry having a plurality of entries, each entry including an implementation definition defining an implementation for an interface within the distributed object computing system, an implementation identifier, and associated functions, the computer program product comprising computer-readable program code for effecting the following within the computer system:
   receiving a marshal buffer containing an object reference to the server object;
   peeking at a subcontract identifier in the object reference in the marshal buffer, the subcontract identifier identifying a unique dispatch function of a subcontract used for invoking the server object;
   calling the unique dispatch function of the subcontract identified by the subcontract identifier in the object reference;

extracting an implementation identifier from the object reference in the marshal buffer;

determining an implementation definition within the implementation registry by using the extracted implementation identifier as a key;

calling a lookup function of the implementation definition in order to produce a location indicator to the server object; and calling a skeleton dispatch function of the implementation definition in order to invoke the object method defined on the server object.

21. A computer program product as recited in claim 20 further comprising program code for effecting:

extracting a subcontract identifier from the object reference in the marshal buffer; and verifying that the extracted subcontract identifier matches a current subcontract.

22. A computer program product as recited in claim 20 further comprising program code for effecting:

extracting a server identifier from the object reference in the marshal buffer;

determining if the extracted server identifier matches a current server; and wherein when it is determined that the extracted server identifier does not match a current server the computer program product further comprises program code for calling a bad server identifier handler function that is identified in a subcontract registry.

23. A computer program product as recited in claim 20 wherein calling a lookup function includes:

extracting the lookup function from the determined implementation definition; and extracting a user key from the object reference in the marshal buffer.

24. A computer program product as recited in claim 20 wherein calling a skeleton dispatch function includes:

extracting the skeleton dispatch function from the determined implementation definition; and extracting a method descriptor from the object reference in the marshal buffer.

* * * * *